US012621270B2

(12) United States Patent
Alabbasi et al.

(10) Patent No.: US 12,621,270 B2
(45) Date of Patent: May 5, 2026

(54) MASKING OF PRIVACY RELATED INFORMATION FOR NETWORK SERVICES

(71) Applicant: Telefonaktiebolaget LM Ericsson (publ), Stockholm (SE)

(72) Inventors: Abdulrahman Alabbasi, Kista (SE); Massimo Condoluci, Solna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 150 days.

(21) Appl. No.: 18/293,441

(22) PCT Filed: Aug. 18, 2021

(86) PCT No.: PCT/EP2021/072936
§ 371 (c)(1),
(2) Date: Jan. 30, 2024

(87) PCT Pub. No.: WO2023/020690
PCT Pub. Date: Feb. 23, 2023

(65) Prior Publication Data
US 2024/0340269 A1     Oct. 10, 2024

(51) Int. Cl.
*H04L 29/06* (2006.01)
*G06F 21/62* (2013.01)
*H04L 9/40* (2022.01)

(52) U.S. Cl.
CPC .......... *H04L 63/04* (2013.01); *G06F 21/6254* (2013.01)

(58) Field of Classification Search
CPC ... H04L 63/04; H04L 63/205; H04L 63/0421; G06F 21/6254; H04W 12/02; H04W 4/02
See application file for complete search history.

(56) References Cited

U.S. PATENT DOCUMENTS

| | | | |
|---|---|---|---|
| 8,646,030 B2 * | 2/2014 | Hu | H04L 63/20 |
| | | | 726/1 |
| 2012/0246736 A1 * | 9/2012 | Huang | G06F 21/6254 |
| | | | 726/26 |

(Continued)

FOREIGN PATENT DOCUMENTS

| | | | | |
|---|---|---|---|---|
| GB | 2534830 A | * | 8/2016 | H04W 4/02 |
| WO | 2017062601 A1 | | 4/2017 | |

OTHER PUBLICATIONS

Shin et al., "Privacy protection for users of location-based services", IEEE Wireless Communications, vol. 19, Issue: 1, Feb. 2012.*

(Continued)

*Primary Examiner* — Morshed Mehedi
(74) *Attorney, Agent, or Firm* — Weisberg I.P. Law, P.A.

(57) ABSTRACT

A method for operating a service consumer which is requesting to utilize a network service provided by a service provider in a cellular network. The method includes, at the service consumer, transmitting a service request to the service provider, the service request including a privacy indication indicating that a privacy related information necessary as input for the network service is requested to be privacy protected when used outside the service consumer, receiving a service response from the service provider, the service response comprising a privacy model and an indication how to use the privacy model, and processing the privacy model at the service consumer based on the indication.

16 Claims, 5 Drawing Sheets

400

| | |
|---|---|
| 410 | Module for receiving service request |
| 420 | Module for selecting privacy model |
| 430 | Module for determining use of privacy model |
| 440 | Module for transmitting the privacy model and use info |

(56) References Cited

U.S. PATENT DOCUMENTS

| | | | | |
|---|---|---|---|---|
| 2015/0350890 A1 | | 12/2015 | Arunkumar et al. | |
| 2019/0222424 A1 | * | 7/2019 | Lindemann | H04L 9/3231 |
| 2021/0117568 A1 | * | 4/2021 | Liu | H04W 12/02 |
| 2021/0256159 A1 | * | 8/2021 | Ninglekhu | H04W 4/70 |
| 2021/0286896 A1 | * | 9/2021 | Zhang | H04L 67/565 |
| 2022/0256495 A1 | * | 8/2022 | Berookhim | H04W 4/029 |

OTHER PUBLICATIONS

Xin et al., "Information Masking Theory for Data Protection in Future Cloud-Based Energy Management," in IEEE Transactions on Smart Grid, vol. 9, No. 6, pp. 5664-5676, Nov. 2018.*
International Search Report and Written Opinion dated May 18, 2022 for International Application No. PCT/EP2021/072936 filed Aug. 18, 2021, consisting of 12 pages.
3GPP TR 22.874 V18.0.1; 3rd Generation Partnership Project; Technical Specification Group Services and System Aspects; Study on traffic characteristics and performance requirements for AI/ML model transfer in 5GS (Release 18); Jun. 2021, consisting of 111 pages.
3GPP TR 37.816 V16.0.0; 3rd Generation Partnership Project; Technical Specification Group Radio Access Network; Study on RAN-centric data collection and utilization for LTE and NR (Release 16); Jul. 2019, consisting of 35 pages.
3GPP TS 23.288 V17.1.0; 3rd Generation Partnership Project; Technical Specification Group Services and System Aspects; Architecture enhancements for 5G System (5GS) to support network data analytics services (Release 17); Jun. 2021, consisting of 192 pages.
Q. Yang et al.; Federated Machine Learning: Concept and Applications; arXiv; ACM Transactions on Intelligent Systems and Technology, vol. 10, No. 2, Article 12; Feb. 13, 2019, consisting of 19 pages.
Kelvin; Introduction to Federated Learning and Challenges; A brief into to Federated learning and challenges; Medium; Towards Data Science; Oct. 18, 2020, consisting of 10 pages.
K. Bonawitz et al.; Practical Secure Aggregation for Privacy-Preserving Machine Learning; In Proceedings of the 2017 ACM SIGSAC Conference on Computer and Communications Security (CCS '17); 2017, consisting of 21 pages.

* cited by examiner

Server equipped with aggregation tools of ML models

S31 — Transmit service request

S32 — Receive service response with privacy model and indication

S33 — Process the privacy model based on indication

S41 — Receive service request

S42 — Select privacy model

S43 — Determine use of privacy model

S44 — Transmit service response with privacy model and use info

100

300

200

400

MASKING OF PRIVACY RELATED INFORMATION FOR NETWORK SERVICES

CROSS-REFERENCE TO RELATED APPLICATION

This application is a Submission Under 35 U.S.C. § 371 for U.S. National Stage Patent Application of International Application Number: PCT/EP2021/072936, filed Aug. 18, 2021 entitled "MASKING OF PRIVACY RELATED INFORMATION FOR NETWORK SERVICES," the entirety of which is incorporated herein by reference.

TECHNICAL FIELD

The present application relates to a method for operating a service consumer and for operating a service provider. The invention furthermore relates to the corresponding service provider and service consumer. Further, a computer program and a carrier comprising the computer program is provided and a system comprising the service provider and service consumer.

BACKGROUND

5G Standard introduced the possibility to request several services offered based on the availability of UE-related information, such as location. As example, the Network Data Analytics Function (NWDAF, defined in 3GPP TS 23.288) is a network function introduced in 5G core network to provide analytics (including AI-based ones) to several consumers, these being other network functions of the core network (e.g., AMF (Access and Mobility Management Function), SMF (Session Management Function) or service-related functions such as Application Function (AF) and consequently application layer. Considering 3GPP TS 23.288, the following analytics deal with location information:

QoS Sustainability Analytics, which generates analytics based on the (mandatory) location information including in the consumer request, where the location information can be an area or a path of interest also reflecting a list of waypoints. The output contains a List of QoS (Quality of Service) sustainability Analytics (RAN (Radio Access Network) UE Throughput and/or QoS Flow Retainability, Applicable Area, Applicable Time Period, Crossed Reporting Threshold(s) (in case of prediction).

Observed Service Experience Analytics, which used the UE location as input provided by the AF when generating the analytics. Observed Service Experience refers to average of observed Service MoS (Mean Opinion Socre) and/or variance of observed Service MoS indicating service MOS distribution for services such as audio-visual streaming as well as services that are not audio-visual streaming such as V2X and Web Browsing services analytics.

NF (Network Function) load Analytics, which uses as inputs UE information such as destination (expected final location of UE), Route (planned path of UE movement), time of arrival at destination. The output contains information such as NF type, NF instance ID, NF status (availability status of the NF on the Analytics target period, expressed as a percentage of time per status value such as registered, suspended, undiscoverable), NF resource usage (average usage of assigned resources such as CPU, memory, disk), NF load (average load of the NF instance over the Analytics target period), NF peak load (maximum load of the NF instance over the Analytics target period), etc.

UE mobility Analytics, which uses as inputs UE trajectory (timestamped UE geographical positions). The output contains information such as UE location statistics for a certain UE group ID or UE ID, where statistics are in the form of list of UE location (tracking areas or cells which the UE stays) and associated ratio (percentage of UEs in the group in case of an UE group)

DN Performance Analytics, which used the UE location as input provided by the AF when generating the analytics. DN Performance Analytics provide analytics for user plane performance for certain S-NSSAI, DNN, UPF, DNAI, where analytics include average traffic rate, maximum traffic rate, average packet delay, maximum packet delay, average packet loss rate.

It should be understood that other network services, in addition to those provided by NWDAF, could also rely on information such as geographical location of UEs and similar types of information.

On top of NWDAF related standardization, 3GPP is also focused on RAN-centric data collection for mobility optimization use-cases as described in 37.816 section 5.3.

3GPP TR 22.874 is investigating aspects related to traffic characteristics and performance requirements for AI/ML (Artificial Intelligence/Machine Learning) model transfer in a 5GS (5G System). Section 7 focuses on distributed/federated learning over 5G system. The current state-of-the-art considers federated learning as a novel machine learning tool that competes with regular ML methods that train on large aggregations of data collected over multiple data sources.

FIG. 1 shows an architectural overview of a system with federated learning. Different clients/UEs 20 to 24 have corresponding Machine learning modules 30 to 34 in order to train locally trained models 40 to 44. The models 40 to 44 are uploaded to a central server 50 which is configured to generate an aggregated model 70.

As described in FIG. 1, Federated Learning (FL) comprises:

Clients 20-24 (e.g. UEs) that train on only local data and don't share this data with anyone.

Servers 50 (e.g. gNB) that combine clients' models.

FL in general follows some steps (as shown in the figure):

Each client 20-24 trains its model on local data.

Clients 20-24 upload each trained model 40-44 (not the data) to gNB 60.

gNB or a server 50 at the gNB 60 combines the clients' model.

gNB 60 sends the combined models to all clients 20-24.

Iterate over the steps till convergence.

When looking at evolutions of 5G systems, e.g. beyond 5G networks or even 6G, an increase in terms of usage of AI/ML-based services is expected and there will be many AI/ML services leveraging on privacy-related information as inputs or features for their AI/ML models. When considering evolutions towards beyond 5G, the following points should be considered:

1. Many AI/ML-based use cases will rely on the exchange of information among multiple nodes, examples being
   a. Knowledge/information/model sharing among groups of UEs
   b. Knowledge/information/model sharing among groups of gNB-DUs and gNB-CUs
   c. Knowledge/information/model sharing among groups of gNB-CUs and core network functions such as UPFs, or among groups of NWDAFs, or among groups of AMFs and SMFs, etc.

2. As many services are expected to leverage on inputs/features based on privacy-related information, generalization becomes relevant. For instance, given that multiple UEs undergo several environments (in the same use-case) or several use-cases generalization of the model becomes important.

When it comes to information exchanges among actors involved in a network procedure, current procedures define how such information should be structured and of course encrypted, but how to handle such information is based on the assumption that there is an SLA (Service Level Agreement) covering the provisioning of privacy-related information such as geographical position of UE, timestamp associated to a certain geographical position, planned route, etc. When extending these services to mass markets, privacy-related implications start to raise. For example, in an automotive context, even if there is an SLA between e.g. a car manufacturer and a network operator to cover the exchange of UE location information for a service like QoS Sustainability Analytics, the actual sharing of the in-vehicle UE location information might be subject to user (i.e., driver, passengers) consent. If the consent is not given, the network operator cannot provide the service. While it might not be a problem for a user to given consent to the car manufacture to use the vehicle location, it might be less obvious that a user will also give consent for vehicle location to be used by "another actor" such as a network operator.

SUMMARY

Accordingly, a need exists to overcome the above-mentioned problems and to be able to effectively protect privacy-related information when consuming a network service where a privacy-related information is necessary.

This need is met by the features of the independent claims. Further aspects are described in the dependent claims.

According to a first aspect a method for operating a service consumer is provided which is requesting to utilize a network service provided by a service provider in a cellular network. The method comprises the steps at the service consumer to transmit a service request to the service provider, wherein the service request comprises a privacy indication indicating that a privacy related information necessary as input for the network service is requested to be privacy protected when used outside the service consumer. Furthermore, the service consumer receives a service response from the service provider, wherein the service response comprises a privacy model and an indication how to use the privacy model. The service consumer then processes the privacy model at the service consumer based on the indication.

Furthermore, the corresponding service consumer is provided comprising a memory and at least one processing unit, wherein the memory contains instructions executable by the at least one processing unit. The service consumer is operative to work as mentioned above or as discussed in further detail below.

As an alternative the service consumer comprises a first module configured to transmit the service request to the service provider which comprises the privacy indication indicating that a privacy-related information necessary as input for the network service is requested to be privacy protected when used outside the service consumer. A second module is configured to receive the service response from the service provider which comprises a privacy model and the indication how to use the privacy model. A third module of the service consumer is configured to process the privacy model based on the indication.

With the privacy indication and the received privacy model it is possible to make sure that the privacy-related information is privacy protected when it is used outside the service consumer. Accordingly, the service consumer can determine and control how the privacy-related information is used in the network.

Furthermore, the method for operating the service provider is provided which is configured to provide a network service in the cellular network. The service provider receives the service request from the service consumer which is configured to utilize the network service, wherein the service request comprises the privacy indication indicating that the privacy-related information necessary as input for the network service is requested to be privacy protected when used outside the service consumer. The service provider selects a privacy model for the service consumer taking into account the privacy indication and determines how the selected privacy model should be used at the service consumer. Furthermore, a service response is transmitted to the service consumer wherein the service response comprises the selected privacy model and the indication how to use the selected privacy model at the service consumer.

In addition, the corresponding service provider is provided comprising a memory and at least one processing unit, wherein the memory contains instructions executable by the at least one processing unit. The service consumer is operative to work as discussed above or as discussed in further detail below.

As an alternative, the service provider comprises a first module configured to receive the service request from the service consumer which comprises the privacy indication for the privacy-related information. The service provider comprises a second module configured to select the privacy model for service consumer taking into account the privacy indication, a third module configured to determine how to use the selected privacy model at the service consumer and a fourth module configured to transmit a service response to the service consumer which comprises the selected privacy model and the indication how to use the privacy model at the service consumer.

The service provider can make sure that the request of the service consumer is respected and that the privacy model helps to obtain the protection of the privacy-related information.

Furthermore, a system is provided comprising the service provider and the service consumer.

Additionally, a computer program comprising program code is provided, wherein execution of the program code causes the at least one processing unit to execute a method as discussed above or as explained above or in more detail below A carrier comprising the computer program is provided, wherein the carrier is one of an electronic signal, optical signal, radio signal, or computer readable storage medium.

It is to be understood that the features mentioned above and features yet to be explained below can be used not only in the respective combinations indicated, but also in other combinations or in isolation without departing from the scope of the present invention. Features of the above-mentioned aspects and embodiments described below may be combined with each other in other embodiments unless explicitly mentioned otherwise.

BRIEF DESCRIPTION OF THE DRAWINGS

The foregoing and additional features and effects of the application will become apparent from the following detailed description when read in conjunction with the accompanying drawings in which like reference numerals refer to like elements.

DETAILED DESCRIPTION

Figure 1:
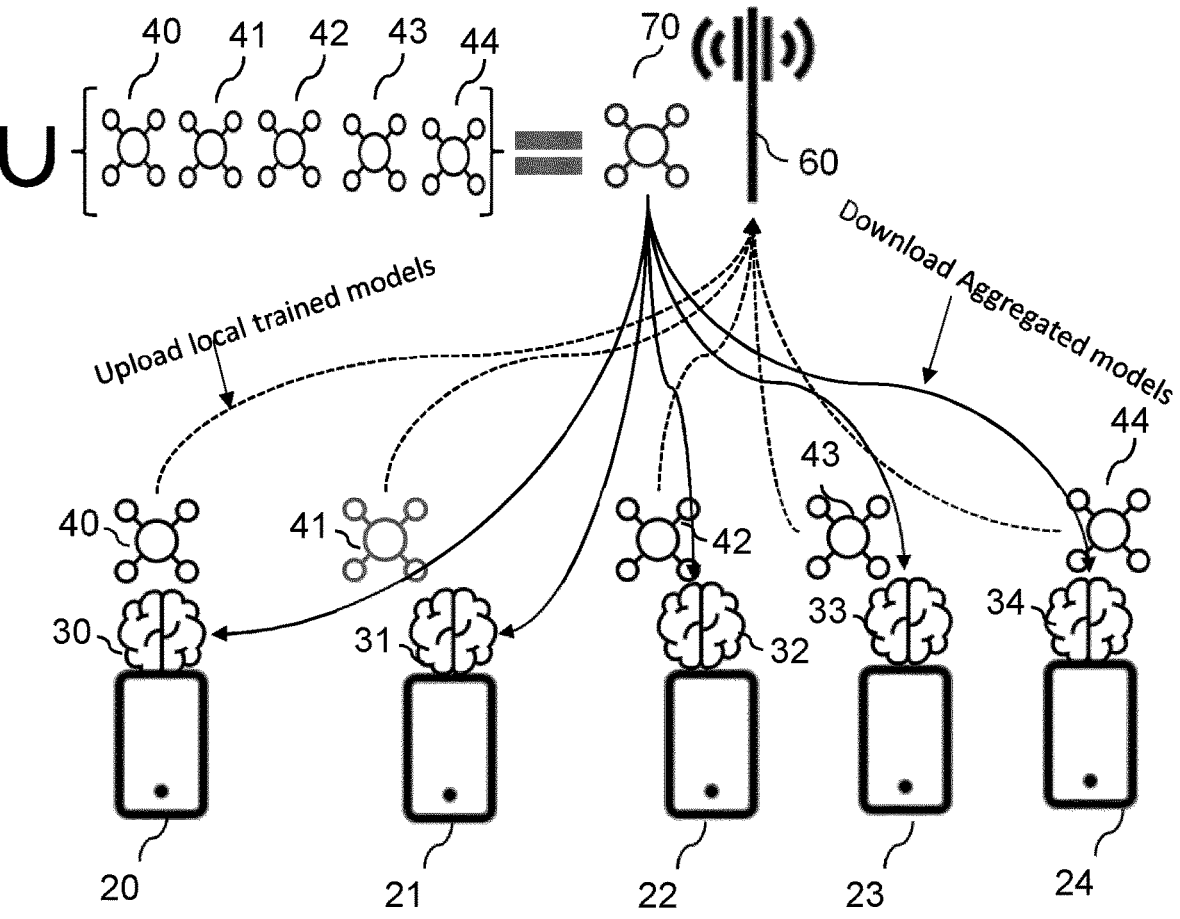
FIG. 1 shows an architectural overview of a system with federated learning.

In the following, embodiments of the invention will be described in detail with reference to the accompanying drawings. It is to be understood that the following description of embodiments is not to be taken in a limiting sense. The scope of the invention is not intended to be limited by the embodiments described hereinafter or by the drawings, which are to be illustrative only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components of physical or functional units shown in the drawings and described hereinafter may also be implemented by an indirect connection or coupling. A coupling between components may be established over a wired or wireless connection. Functional blocks may be implemented in hardware, software, firmware, or a combination thereof.

Within the context of the present application, the term "mobile entity" or "user equipment" (UE) refers to a device for instance used by a person (i.e. a user) for his or her personal communication. It can be a telephone type of device, for example a telephone or a Session Initiating Protocol (SIP) or Voice over IP (VoIP) phone, cellular telephone, a mobile station, cordless phone, or a personal digital assistant type of device like laptop, notebook, notepad, tablet equipped with a wireless data connection. The UE may also be associated with non-humans like animals, plants, or machines. A UE may be equipped with a SIM (Subscriber Identity Module) or electronic-SIM comprising unique identities such as IMSI (International Mobile Subscriber Identity), TMSI (Temporary Mobile Subscriber Identity), or GUTI (Globally Unique Temporary UE Identity) associated with the user using the UE. The presence of a SIM within a UE customizes the UE uniquely with a subscription of the user.

For the sake of clarity, it is noted that there is a difference but also a tight connection between a user and a subscriber. A user gets access to a network by acquiring a subscription to the network and by that becomes a subscriber within the network. The network then recognizes the subscriber (e.g. by IMSI, TMSI or GUTI or the like) and uses the associated subscription to identify related subscriber data. A user is the actual user of the UE, and the user may also be the one owning the subscription, but the user and the owner of the subscription may also be different. E.g. the subscription owner may be the parent, and the actual user of the UE could be a child of that parent.

The solution discussed below covers the following aspects:

1. It proposes a signaling framework, that can be applied to several network services, where a service consumer can ask for a privacy service when the network service it wants to access deals with privacy-related information.

2. It utilizes privacy enabling machine learning models in the process of providing the service to the service consumers (e.g., UE, AF, application). It also encodes the private data before sending it to the service provider (if needed).

3. It utilizes the distributed knowledge and/or experience available at the nodes (e.g., embedded in the distributed ML models) among multi-service consumers and providers.

Furthermore, it enables service availability at either the service provider or consumer sides (or both) without requiring explicit transfer of privacy-related information.

A mobile/cellular network is extended with the capability of providing a privacy model to a service consumer. For a service consumer who wants to access a certain network service that requires a privacy-related information as input/features, the solution discussed below introduces procedures that allow the service consumer to indicate its desire in masking its privacy-related information. Based on such request (jointly with other inputs), the mobile network will select and provide to the consumer the adequate privacy model. Depending on the selected privacy model, the consumer could directly use the outputs of the privacy model to predict the required service or signal the output information of such privacy model (e.g., outputs of the privacy model after inference) in a subsequent network service request to the mobile network. In the first option the privacy related information is only used at the service consumer and the privacy model comprises a service model which directly provides the requested network service. In the second option the privacy model comprises a protection model which receives as input the privacy related information without privacy protection, the model generating a privacy protected output which is sent to the service provider, where the privacy protected information is used to provide the requested service. The service provider is a functionality within the cellular network, i.e. a network service provider and not necessarily a service provider such as google etc. The solution below can be considered as a core/key enabler for applications where a UE cannot send its information (e.g., location, due to privacy reason) to a cellular network, the radio access part, e.g. the gNB to obtain any service (e.g., QoS prediction information).

In the present disclosure, Network Service means a service offered by a mobile/cellular network which is desired to be accessed by a given consumer but which requires some privacy-related information (e.g., UE location, UE trajectory, etc.) in order to be executed. The Network Service is offered by the Service provider, which might be a NF of a mobile core network, or another network entity such as a gNB. For example, Network services might include, but not limited to, services provided by NWDAF such as QoS Sustainability Analytics, Observed Service Experience Analytics, NF load Analytics, UE mobility Analytics, DN Performance Analytics. Please note that the service per-se might be provided by a different entity than the entity which exposes the service output to the final consumer, e.g., a service might be offered by e.g. NWDAF or AMF or SMF but a consumer might interact with e.g. a NEF (Network exposure Function) and/or a VAE server to retrieve the service.

In the present disclosure, Service consumer refers to the entity which is in charge of interacting with the network to request one or more network services. The service consumer might differ depending on which network service is desired to be accessed, examples might include but are not limited to, 1. UE (or certain layers of the UE protocol stack),
2. an application installed at UE-side,
3. an application function (AF) interacting with a mobile network and with an application server,
4. an application server interacting with an application at UE-side,
5. a VAL (vertical application layer), or e.g., VAE client, at a UE side interacting with an application client at UE side and with a VAE server,
6. a VAL, or e.g., VAE server, interacting with a VAE client and with an application server.

There might be cases where there are separate service consumers for accessing a network service and a privacy service.

In the following an embodiment is discussed in connection with FIG. 2 in more detail.

A procedure for a privacy network service (PNS) is discussed where a service consumer 100 which intends to use a certain network service involving the exchange of privacy-related information, requires the privacy service to a service provider 200 to enable the desired network service while meeting privacy concerns. The high-level steps are described as in illustrated in FIG. 2:

Step S11: The Service consumer sends a Privacy Service Request (PSreq) to a service provider indicating the desired network service including filter information and a privacy class as privacy information. PSreq indicates that the SC (Service Consumer) requires its information to be protected when accessing a certain network service. Such request contains, but not limited to, a. the network service the consumer would like to access, e.g., a pre-defined indicator of the service, name of the service, API of service.
b. information associated to the network service such as
  i. filter information (if any) (such as which UEs are addressed), and
  ii. a Privacy classes.

Step S12: The service provider 200, based on the information included in the Privacy Service Request, selects a privacy model which is relevant to the required privacy class indicated in the request.

Step S13: The service provider sends a Privacy Service Response (PSres) to the service consumer which includes a. the selected privacy model, and
b. an indication on
  i. Update the model or not before using it
  ii. how to use the outputs of the privacy model.
    1. Directly infer the QoS prediction
    2. Send the output of the model to NW
  iii. Send the updated model back to network or not, Step S14: The service consumer processes the response PSres which includes the privacy model and some indications including that on how to use the outputs of the privacy model. Processing includes, but not limited to, updating the privacy model, send the updated version back to network, or configuring the usage of the privacy based on the information included in the response.

Step S15: The service consumer may optionally update the privacy model or not depending on the indication sent by PSres. The local update of the sent privacy model should be done before step S16. However, if the PSres indicated to send the locally updated model, then the transmission could occur at any step after the update.

Step S16: The service consumer directly uses the privacy model (Case S16a) or determines whether the service consumer should continue with a Network Service Request (Case S16b). Case a—the privacy model provided by the service provider in step S14 includes the service model including the Network Service requested by the service consumer 100. In this case, when running the privacy model, the consumer provides as input the privacy-related information and the other information requested by the network service. The output of the model is the desired network service. So, for this case, the following step is:

S16a: The service consumer 100 (after injecting the privacy-related information to the privacy model) directly uses the outputs of the privacy model, which includes the network service, provided by the service provider.

Case b—the privacy model as received comprises a protection model which helps to protect the privacy related information provided by the service consumer by generating an output to be included by the service consumer when requesting the desired Network Service. So, for this case, the following steps are:

S16b. The service consumer sends a Network Service Request including the outputs of the privacy model as input information of the request (in addition to the other information which are associated to the Network service). The privacy related information is determined with privacy protection as an encoded latent variable output by an encoder part which is included in the protection model sent in step S13.

(case-b) Step S17b: The service provider 200 processes the request, and uses the outputs of the privacy model as inputs (together with the other inputs associated to the service and provided in the request) to provide the desired service.

(case-b) Step S 18b: The service provider 200 provides the Network service response to service consumer 100. This step is the same step as in the legacy network service response (i.e., without usage of the privacy service). This updated model is for use in next requests and hence can be aggregated with the existing models.

Step S19: Following step S14, the service consumer might be requested to send the updated privacy-model to the network, if requested in the indication at PSres, which is processed in step-4. This could be done at any point of time after the local update in step S15.

After this high level description of the process, the different steps and the information exchanged is discussed in more detail.

S11: PSres

Frist of all, the transmitted service request of step S11 the signal PSres is discussed in more detail:

In an illustrative embodiment, the service consumer 100 could provide a single or group of the following parameters to the network when sending a privacy service request.

1. Network service, which indicates the target service the consumer would like to access and for which the privacy service is requested. Examples of network service are QoS Sustainability Analytics, Observed Service Experience Analytics, etc. The indication could also include additional information associated to the network service, e.g., filter information in case these are applicable to the service. As part of the network service, the indication could also include additional information of the targets of the network service, e.g., a list of specific UEs.

2. Privacy class, indicating for which input parameter(s) of the network service the consumer is requiring the privacy service. Privacy class information might be complemented with additional information, e.g., if the consumer is interested in privacy service for location information, then it might add additional information such as an indication whether the UE associated to the request is a low/medium/high mobility, or an information about the average speed, or an indication whether it is a pedestrian/vehicle, or an indication whether it is a car/truck/motorbike, etc.

3. Latent variable of a consumer auto-encoder trained to improve privacy-masked predicted network service, considering the training target of the request network service.

4. Privacy model characteristics, such as:
   a. an indication of the maximum supported complexity by the user consumer capability (to process the privacy model).
   b. An indication on preference to support some AI algorithms.
   c. Accuracy of the privacy model, indicating a specific accuracy threshold above which the privacy model provided by the service provider is expected to work.
   d. Preference on encoding the service model The privacy service request could be realized considering different implementations. In one implementation, the service consumer might leverage on a modification of an already existing Network Service Request, where the service consumer adds a tag to indicate within this request the desire to get privacy protection for the inputs of the network service. As an example, the consumer 100 could send a request for QoS Sustainability Analytics, where instead of including the inputs required by the QoS Sustainability Analytics, an indication/field is added that it would require privacy protection for the location information associated to the QoS Sustainability Analytics service. In this case, the service provider is directly aware of this network service the consumer is interested in (e.g., QoS Sustainability Analytics), and the novel information added to the request makes the service provider aware of the fact that the consumer desires privacy protection for the location information. A second example of implementation is when a procedure dedicated for Privacy Service Request is used. In this case, the consumer indicates explicitly which network service he/she is interested in.

Periodicity of such transmission (and corresponding request or trigger of such procedure) can vary, depending on e.g.,
   a. Every change of network service the consumer is interested in.
   b. Every accuracy margin change
   c. Changes at service consumer. There could be many, including e.g. change of geographical area where the service is located, change of e.g. trajectory/speed of the UE associated to the service, changes of other parameters at the UE-side such as changes in the set of applications used, etc.

Potential ways of transmitting such request:
   a. If the service consumer is at UE-side
      i. Via NAS signalling (received by AMF and then provided to other relevant NFs). This could be e.g. triggered by applications at UE-side and then interacting with the UE via e.g. AT commands to trigger the relevant NAS message.
      ii. Via UP data (received by the AS/AF and then processed and provided to the relevant NFs)
      iii. Considering industry-specific functionalities such as automotive, the privacy service request could be triggered by an application and then a VAE-client could interact with a VAE server and then with the corresponding NF.
   b. If the service consumer is one of RAN layers, PHY, MAC, RLC, RRC, PDCP. The signals can be over either control or data signals:
      a. MAC PDU or MAC CE
      b. PUCCH or PUSCH
      c. DRB or SRB
   c. if the service consumer is at server side,
      iv. an AS/AF (autonomously or upon reception from application client side) then interacting with the relevant core NFs, which could include interacting with e.g. a NEF which in turns interact with the relevant service provider The signaling for privacy service request might be dependent on the 'Network-Service' the service consumer is interested in, i.e., if the target network service is also in charge of provisioning the privacy service and the service provider can be retrieved by e.g. interaction with an NWDAF via NEF, then the privacy service should be requested/obtained via NWDAF with interactions via NEF.

In an alternative embodiment, the privacy service class (reflected by the model, and requested by the consumer) can be defined in accordance to:
   1. Core network and RAN privacy metrics.
   2. Vendor product development process security measures.
   3. Deployment and Operation process security measures.
   4. Service consumer privacy metrics (such as location, network tracks, etc).

S12. Selection of Privacy Model

The selection process can be thought of as another AI model (or classical optimization agent) that is used to select a privacy model to be sent to the service consumer 100. Description includes input, output, and content of such selection process model.
   a) The service provider 200 might consider the following input to the selection process (can be AI or non-AI process) which chooses the requested privacy model by the service consumer (such a selection model is described below in an embodiment b)) per the requesting service consumer:

1. Target service consumer associated cell.
2. Radio channel condition for the corresponding service consumer.
3. Network internal UE assisted information (e.g., predicted network trajectory)
4. Latent variable that is sent by the service consumer 100 (and can represent consumer intent). Such variable would have been sent to the service provider (or network) by the service consumer frequently in every pre-determined period P_LV, or every indication sent by the PSres illustrated above.
5. Requested network service, which is sent to the service provider from the service consumer as illustrated in PSreq above.
6. Requested Privacy class, which is sent in PSreq as illustrated above. Such parameter reflects some of the service consumer privacy information. For example,
   a. Location of the service consumer
   b. Consumer's tracks of network usage.
   c. Connected devices for which this consumer acts as a master node.
   d. etc.
7. Change of information associated with the privacy class (e.g., change of average speed, location, network usage tracks, etc).
8. The selected model should be used directly or indirectly at the service consumer side. Both direct and indirect options are illustrated in embodiment described below.
9. The updated time, accuracy, computation size, and identification number of each of local and global privacy model (recently updated by the service consumer),
   a. which was sent to service provider in step 1 or 9 of section 2.
   b. Or, aggregated of multiple local models b) The service provider 200 would run procedures that select one or a group of the available privacy models to respond to the service consumer (such selection is conducted using the inputs described in embodiment a) and some of the output described in embodiment (c)). Such procedures of selecting the requested model (in PSreq signal) are folded as:

Option (1): Running clustering algorithm on all existing privacy service models and select the one with shortest distance to privacy service request characteristics (described using the input to the model, as in embodiment (a)) with output as described in embodiment (c). This clustering algorithm could use one (or a combination) of the following algorithms:
   a. Principle component analysis
   b. K-Means Clustering
   c. Mean-Shift Clustering
   d. Density-Based Spatial Clustering
   e. Expectation-Maximization Clustering Gaussian Mixture Model
   f. Agglomerative Hierarchical Clustering
   g. Principal component analysis clustering Option (2): An alternative to Option (0), service provider could run a classifier algorithm (characterized using the inputs to the model, as in embodiment (a) with some output as described in embodiment (c)).

a. Decision Trees and random forest
   b. KNN
   c. Gradient boosting c) The output of the privacy service model selection process (mentioned in embodiment b)) could be described as follows:
   a. Group of models that should be aggregated, identified by minimum distance among them using e.g., Option (1) especially when selection module runs a clustering algorithm, e.g., PCA, etc.
      i. Corresponding aggregation methodology are described in embodiment d).
   b. A single or multiple identification numbers for selected models. Such identifier can be single integer reference to the model as described in embodiment (f).
   c. Decision for the service consumer whether it should:
      i. Update the model locally and send it back.
      ii. Use the single or aggregated model before or after the update
      The above points (a, b, and c) describe 3 potential outputs of the selection process. Those outputs can be independent or together with another output. For instance, output (a) and (c) can be trained jointly, whereas output (b) and (c) can be trained jointly.

d) In another embodiment, the service provider 200 aggregates the selected group of privacy service models before sending them as a selected privacy model to the service consumer. The aggregation process can be conducted via different methods, e.g., simple averaging.

e) In another embodiment, such selected group of models could be obtained:
   a. Locally, i.e., trained at service consumer 100 then sent over to the service provider 200 for knowledge sharing and aggregation purposes.
   b. Globally, at different level of the same service provider, where each level spans overlapped or non-overlapped service consumers.
   c. Globally, at different service providers, given an agreement among them.

f) In another embodiment, each privacy service model at the service provider could be tagged with:
   a. Identification number
   b. Achievable accuracy target
   c. Privacy class
   d. Service class
   e. Associated size of the model and corresponding structure.

g) In a further embodiment, the group of services classes can be constructed based on 5QI index. For instance:
   1. Each index of 5QI is a service class.
   2. Grouping set of indices of 5QI element as a single service class.

h) In an alternative embodiment, the privacy service class (reflected by the model, and requested by the consumer) can be defined in accordance to:
   5. Core network and RAN privacy metrics.
   6. Vendor product development process security measures.
   7. Deployment and Operation process security measures.
   8. Service consumer privacy metrics (such as location, network tracks, etc).

Signal PSres

Depending on the selected privacy model, the service provider can include in the Privacy Service Response (PSres):

1. The selected or aggregated model, such model could be, e.g., conventional Neural Network, generative adversarial network, attention network. Etc.
2. An indication of whether any type of privacy encoding is included or not (e.g., differential privacy).
3. An indication on whether or how the privacy model should be used
   a. Directly, at the service consumer side, to obtain the desired network service (case a), and
      i. The PSres indication signal provides information which inputs should be provided to the model in addition to the privacy-related information (as illustrated in case-a FIG. 2). Examples on such inputs could be user consumer's: 1) location, 2) destination, 3) service class, 4) privacy class, etc.
   b. In-directly, where the privacy model is used to generate relevant information to model which are going to be used in a subsequent procedures in the network service provider (as illustrated in case-b FIG. 2). Such relevant information can be signals that are generated by inferring from privacy model and the local input.
      i. Such signals (used in the service provider) can be considered as latent variables representation of the explicit user consumer metrics.
   c. Another content, of this indication (in case of in-direct usage), is the training target of the model, for which the encoded masked data (or the latent variables representation) of the input (described in previous point) should trained.
      i. Note that such target could be the input itself, or another QoS related target.
4. An indication on frequency of using such model.

The Service Response S13

After the service consumer 100 receives the PSres model from the service provider, it should train the model via:

1. Decode its encryptions (such as: differential privacy, if it included and can be decoded)
2. In re-training phase (if indicated by PSres):
   a. Input the privacy-related information, e.g., UE trajectory, service class, and destination.
   b. Guarantee convergence of training phase of the model sent by PSres, to be ready for sending it back to the service provider to be used for future PSres.
3. Output encoded masked data (or representative latent) variable that will help the desired network service.
4. In inference stage (case 6-b):
   a. Input the privacy-related information, e.g., UE trajectory, service class, and destination.
   b. Output encoded masked data (or representative latent) variable that will help the desired network service.
   c. Send the encoded masked data variable to the service provider to enable prediction of privacy network service prediction response
5. In inference stage (case 6-a):
   a. Input the privacy-related information, e.g., UE trajectory, service class, and destination.
   b. Output the predicted QoS.

The frequency of processing the model sent via PSres (as described in previous section):

1. Every change of service class
2. Every accuracy margin change
3. Every change in the value of the privacy model inputs (e.g., change of UE trajectory)
4. Change of information associated to the privacy class (e.g., change of average speed)

The above events (in embodiment Q) could trigger:

a. Re-training of the privacy model.
b. Sending the retrained privacy model to the service provider.
c. Another inference phase and usage of new output of this inference phase (in case-a).
d. Sending the new inference encoded masked (or latent) variable to the service provider (in case-b)

In the following an example is discussed in further detail. The case is considered that the service consumer is an AF interested in accessing the QoS Sustainability Analytics service offered by NWDAF. For the sake of simplicity, it is assumed that NWDAF also offers the privacy network service.

Legacy Procedure

For this example, the legacy procedure refers for the QoS Sustainability Analytics defined in 3GPP TS 23.288 § 6.9. The procedure is as follows:

Step S11 of TS 23.288 § 6.9: the AF (service consumer) sends to NWDAF (service provider) a QoS Sustainability Analytics request, which includes:

Analytics ID="QoS Sustainability";
Target of Analytics Reporting: "UE ID":
Analytics Filter Information containing:
   5QI, GFBR (Guaranteed Flow Bit Rate);
   Location information (mandatory): list of waypoints the UE ID is expected to cross and associated timestamps, e.g., [position A, time A; position B, time B; position C, time C;]
   S-NSSAI;
   Analytics target period: time interval, e.g., in the future, that indicates the time period for which the QoS Sustainability analytics is requested, e.g., [from time A to time B]

Step S12 of TS 23.288 § 6.9: The NWDAF processes the request and collects the data from the OAM. As the AF indicates the GFBR in the analytics filter information, NWDAF collects input data in the form of RAN UE Throughput from OAM. To generate a relevant analytics based on the location information provided by the AF, based on the actual implementation, the NWDAF processes the request to fetch the location information of interest for the AF (as well as the associated target period and 5QI, S-NS-SAI), and accordingly collect input data from OAM that match the request (i.e., NWDAF use the location informa-tion, 5QI, S-NSSAI from the AF to filter which information should be collected from OAM).

Step S13 of TS 23.288 § 6.9: the NWDAF processes the input data from OAM and generates the requested QoS Sustainability Analytics. If for example NWDAF uses an AI model, an example could be that NWDAF generates the QoS Sustainability Analytics by giving as inputs the data gath-ered from OAM. Another example might be that NWDAF uses an AI model providing as inputs the data gathered from OAM and the information included in the request, e.g., UE ID, 5QI, GFBR, Location information, S-NSSAI. In the latter case, the NWDAF is using the location information as one of the inputs to the AI model to generate the QoS Sustainability Analytics.

Step S14 of TS 23.288 § 6.9: the NWDAF provides the QoS Sustainability response to the AF. This is equivalent to step 8 in our proposed procedures (Case-B).

The Invention—Case a)

Figure 2:
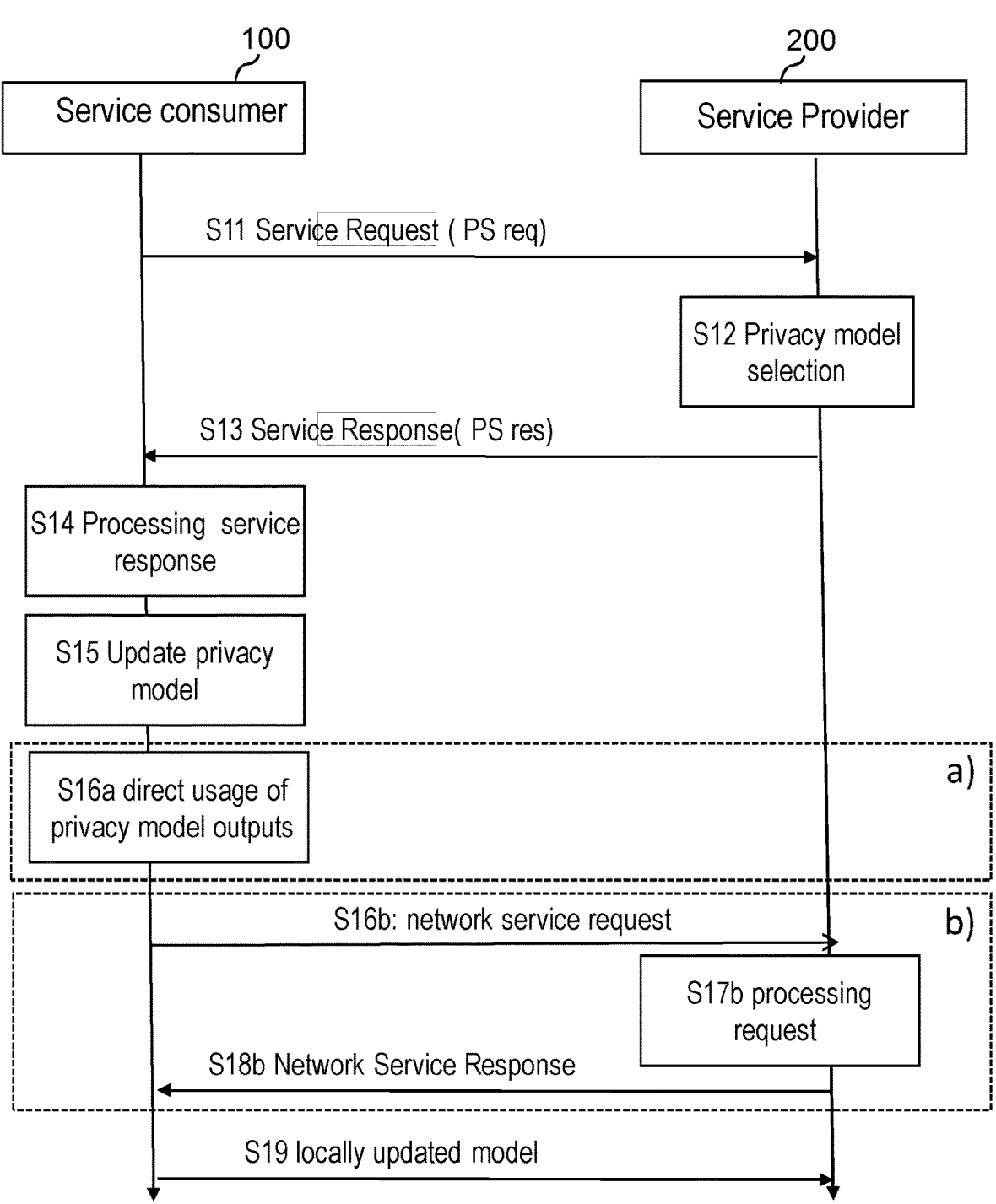
FIG. 2 shows the time series a message exchange between the involved entities of the protection of privacy related information.

In this section, exemplary procedures of the flow chart of FIG. 2 are discussed in more detail.

Step-S11: The service consumer sends PSreq to the server provider, which is a message containing for example the following information:

a) Service name: QoS Sustainability Analytics.

b) Filter info: 5QI, GFBR, S-NSSAI.

c) Privacy class: category-1 of privacy (high privacy).

d) Privacy model characteristics: indication of the maximum supported complexity (to process the privacy model).

Step-S12: The service provider selects the model to provide to the consumer for computing the QoS Sustainability Analytics with its private information. Using the inputs (QoS Sustainability Analytics, 5QI, GFBR, S-NNAI, Cat-1 privacy, maximum supported complexity) from the service consumer, the service provider classification (DNN) model outputs a tag-ID of the models available to be sent to service consumer. In this case, the maximum supported complexity indicated by the service consumer is high enough to the consumer to directly run the AI model for predicting the requested QoS Sustainability Analytics. The training of such service provider classification model could be done offline.

Step S13: For instance, in PSres signal, the service provider sends, a) the selected model:

a. Number of layers and number weights of all NN layers, b. and output of all layers as relu function.

c. Loss function MSE d. This model is expected to be used as service QoS Sustainability Analytics part in the service consumer.

b) indicator on whether the service consumer should use the sent model or not and that the service consumer (in this example) can use the model for generating directly the QoS Sustainability Analytics (Integer 1 is to use the sent model for obtaining the QoS Sustainability Analytics)

c) Indicator on whether to update the model before usage or not (Integer 1 is to update the model)

d) Indicator on which KPI to use for updating, (Integer 1 is to use UE throughput for updating)

e) Indicator of which type of encryption is used (Integer 0 is if there is no encryption is used on the model).

f) List of features to be used as input to the model (e.g., location information, 5QI, GFBR, S-NSSAI).

Step S14: For instance, the service consumer will:

a) decode/receive the signal from service provider and choose the local private information (the UE location and associated timestamps) as input to the model received by the service provider.

b) Decode/Receive information indicating the desired output of the inference stage, i.e., the QoS Sustainability Analytics with target UE throughput.

c) Prepare for updating the model (given that signal 1 was received in PSres on the corresponding octet). For example, prepare 70% of the local data for such update.

Step S15: if the updating model signal in Step-4 was 1, then the service consumer should use part of its input data (e.g., 70% location information) to update the model.

Step S16a: The service consumer uses the features indicated in the PSres for inference, such features include local private data (UE location and associated timestamps, e.g., [position A, time A; position B, time B; position C, time C;]) as well as other inputs data (5QI, GFBR, S-NSSAI) used for inferring the output through the model received in step-3 (Inference stage), predicted UE throughput as part of QoS Sustainability Analytics.

Step S19: The service consumer sends the updated model to the pool of models at the server provider.

In a parallel track to the above procedures, the service provider could run periodically the federation process, not necessarily associated with each PSreq. This federation process includes:

a) Local update of the model (which is included in Step-5 in the proposed algorithm).

b) Send of the local updated model to the service provider (which is included in Step-9 of the proposed algorithm).

c) The service provider aggregates a group of locally updated models (this procedure is included in the selection of privacy protecting model in Step-2).

d) The service provider sends the aggregated model to service requester consumer.

The Invention Case b)

Step S11: The service consumer sends PSreq to the server provider, which is a message containing for example the following information:

a) Service name: QoS Sustainability Analytics.

b) Filter info: 5QI, PDB, PER, S-NSSAI.

c) Privacy class: category-1 of privacy (high privacy).

d) Privacy model characteristics: indication of the maximum supported complexity (to process the privacy model).

Step S12: The service provider selects the model that the service consumer will use for obtaining the masking of privacy-related information. Using the inputs (QoS Sustainability Analytics, 5QI, GFBR, S-NSSAI, Cat-1 privacy, maximum supported complexity) from each service consumer, the service provider classification (DNN) model outputs a tag-ID of the models available to be sent to service consumer. In this case, the maximum supported complexity indicated by the service consumer is not high enough to the consumer to directly run the AI model for predicting the requested QoS Sustainability Analytics, so the model selected by the provider to be provided to the consumer is a model for generating encoded latent variable, which will then be used by the provider (instead of the consumer's privacy-related information) to predict the requested QoS Sustainability Analytics. The training of such service provider classification model could be done offline.

Step S13: For instance, in PSres signal, the service provider sends, a) the selected model:

a. Number of layers and number weights of all NN layers, b. and output of all layers as relu (Rectified Linear Units or rectified liniear activation function. Other examples could be: sigmoid, logistic, Tanh, Hyperbolic, Leaky relu.

c. Loss function MSE (Mean Square Error)

b) indicator on whether the service consumer should use the sent model or not and that the service consumer (in this example) can use the model for generating encoded latent data (Integer 3 to use the sent model for generating encoded latent variables)

c) Indicator on whether to update the model before usage or not (Integer 1 to update the model)

d) Indicator on which KPI to use for updating, (Integer 1 to use UE throughput for updating)

e) Indicator of which type of encryption is used (Integer 0 if there is no encryption is used on the model).

f) List of features to be used as inputs for the selected model (e.g., UE locations and related timestamps)

Step S14: For instance, the service consumer will:

a) decode/receive the signal from service provider and, based on the information included in the PSres, select the local private information (the UE location and associated timestamps) as input to the model received by the service provider.

b) Decode/receive information indicating the output of the inference stage, i.e., encoded latent variable (to be provided to the service provider for generating the requested QoS Sustainability Analytics).

c) Prepare for updating the model (given that signal 1 was received in PSres on the corresponding octet). For example, prepare 70% of the local data for such update.

Step S15: if the updating model signal in Step S14 was 1, then the service consumer should use part of its input data (e.g., 70% location information) to update the encoder part of the model.

Step S16 b: The service consumer uses the model provided by the service provider in the PSres, i.e., the service consumer uses the local private data (UE locations and its timestamps [position A, time A; position B, time B; position C, time C;]) for inferring the bottleneck output (inference stage) sent by step 3, encoded latent variable output.

Consequently, the service consumer sends to the service provider a QoS Sustainability Analytics request, which includes:

Analytics ID="QoS Sustainability";

Target of Analytics Reporting: "UE ID";

Analytics Filter Information containing:

5QI, GFBR;

S-NSSAI;

Encoded latent variable

Time-stamp of the encoded latent

Step S17: the service provider uses the encoded latent variable (and its time-stamp) sent by service consumer in Step S16b, as input to its QoS Sustainability Analytics model alongside other inputs data from the consumer (e.g., 5QI, GFBR, S-NSSAI) as well as input data from OAM. These inputs are used for generating the QoS Sustainability response. The encoded latent variable (and its time-stamp) might be also used to updates its global service provider model.

Step S18: the service consumer provides the QoS Sustainability response to the service consumer.

Step S19: The service consumer sends the updated encoding part of the auto-encoder model to the pool of encoder models at the server providers (if explicitly required by the provider).

Figure 3:
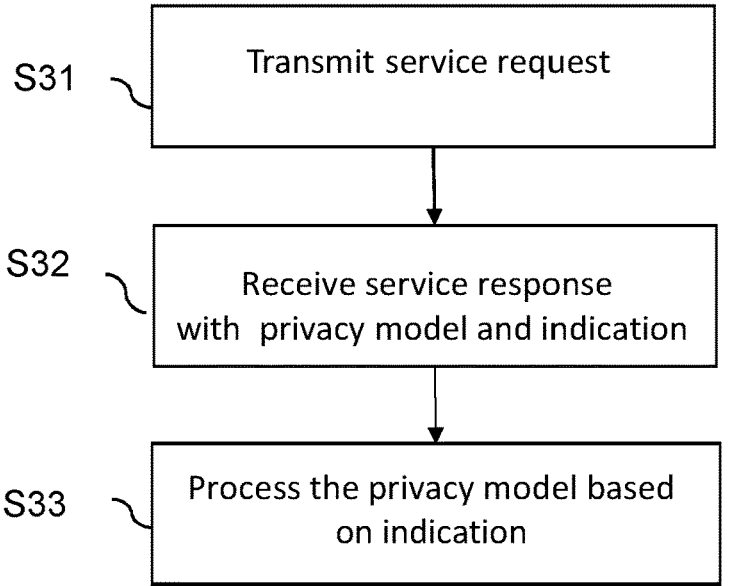
FIG. 3 shows an example flowchart of a method carried out by a service consumer in order to obtain a protection of privacy related information.

FIG. 3 summarizes some of the steps carried out by the service consumer 100 in the embodiments described above. According to one step S31 the service consumer transmits a service request to the service provider as was discussed above in connection with step S11. The service request comprises the privacy indication which indicates that the privacy-related information should be protected when used outside the service consumer. The request furthermore comprises information about the required network service and the privacy class as privacy indication. The service provider receiving the request selects a privacy model and in step S32 the response as transmitted by the service provider is received at the service consumer comprising the privacy model and the indication how to use the privacy model. Depending on the cases discussed above whether the privacy model is a service model directly used at the service consumer or a protection model with which the privacy-related information can be protected and then transmitted to the service provider, the indication indicates how to use the privacy model at the service consumer. In step S33 the service consumer processes the privacy model based on the indication. The processing was discussed above in connection with step S14.

Figure 4:
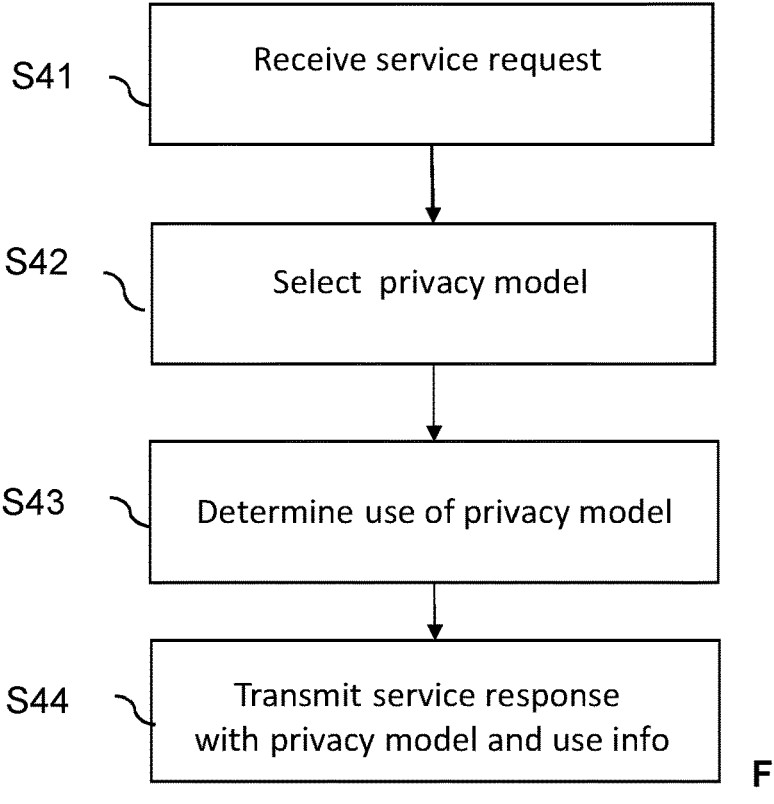
FIG. 4 shows an example flowchart of a method carried out by a service provider in order to obtain a protection of privacy related information.

FIG. 4 describes in more detail some of the steps carried out at the side of the service provider. In step S41 the service provider receives the transmitted service request of step S31 or step S11. The service provider then selects a privacy model in step S42 as discussed above in connection with step S12. Additionally, the service provider determines how the privacy model should be used. The use of the privacy model depends on the fact whether the selected privacy model comprises the service model which directly provides the requested network service at the side of the service consumer when used at the service consumer or whether the privacy model includes a protection model which helps to generate a privacy protected privacy-related information. The different use cases were discussed above in connection with step S16A or S16B to S18B. In step S44 the service provider then transmits the selected privacy model and the indication of how to use it to the service consumer as discussed in connection with step S13 above.

Figure 5:
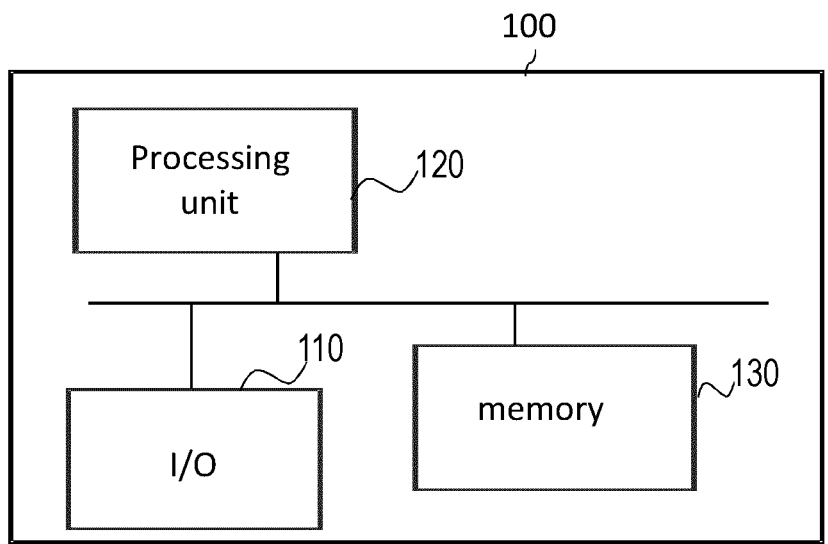
FIG. 5 shows an example schematic representation of a service consumer configured to assure a privacy protected use of a privacy related information.

FIG. 5 shows a schematic architectural view of a service consumer 100 which can carry out the above discussed steps in the interaction with the service provider. The service consumer comprises an interface or input output 110 configured to transmit user data or control messages to the other entities such as the service provider and configured to receive user data or control messages from other entities. The interface 110 is configured to transmit the service request and to receive the service response including the privacy model. The service consumer furthermore comprises a processing unit 120 which is responsible for the operation of the service consumer 100. The processing unit 120 comprises one or more processors and can carry out instructions stored on a memory 130, wherein the memory can include a read-only memory, a random access memory, a mass storage, a hard disk or the like. The memory 130 can furthermore include suitable program code to be executed by the processing unit 120 to implement the above described functionalities in which the service consumer is involved.

Figure 6:
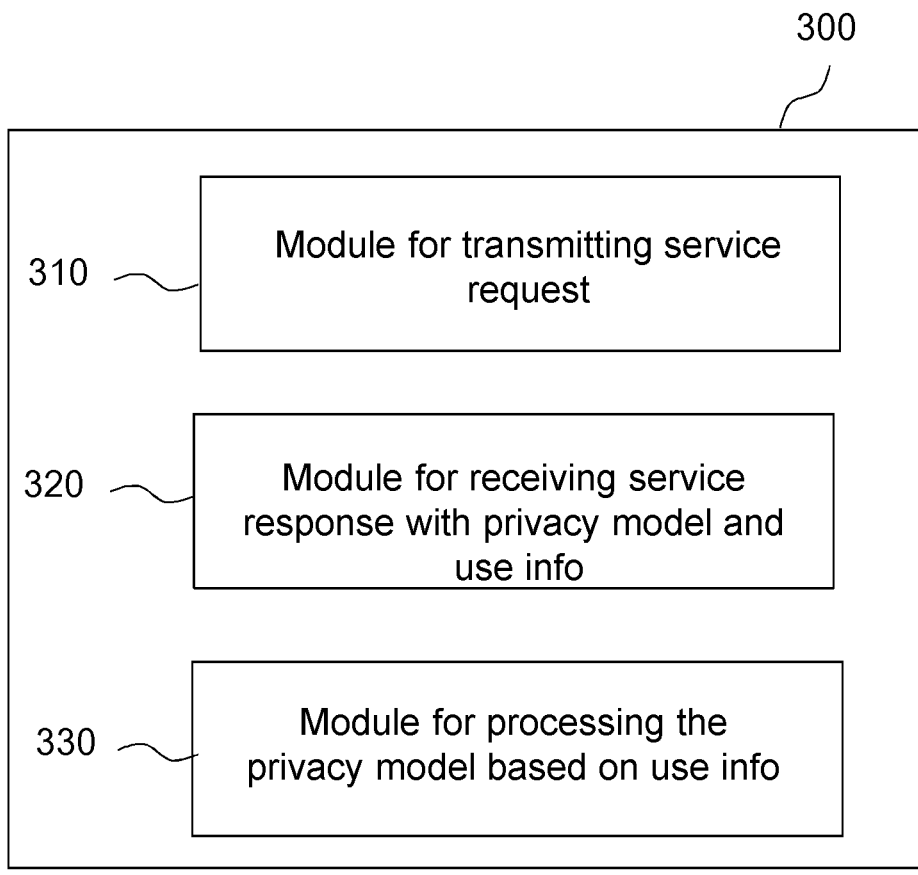
FIG. 6 shows another example schematic representation of a service consumer configured to assure a privacy protected use of a privacy related information.

FIG. 6 shows another schematic architectural review of the service consumer which comprises a first module 310 configured to transmit the service request which comprises the privacy indication indicating that the privacy-related information should be privacy protected when used outside the service consumer. The service consumer 300 comprises a second module configured to receive the service response with the selected privacy model and the indication how to use the privacy model. A module 330 is provided configured to process the privacy model based on the indication how to use the privacy model.

Figure 7:
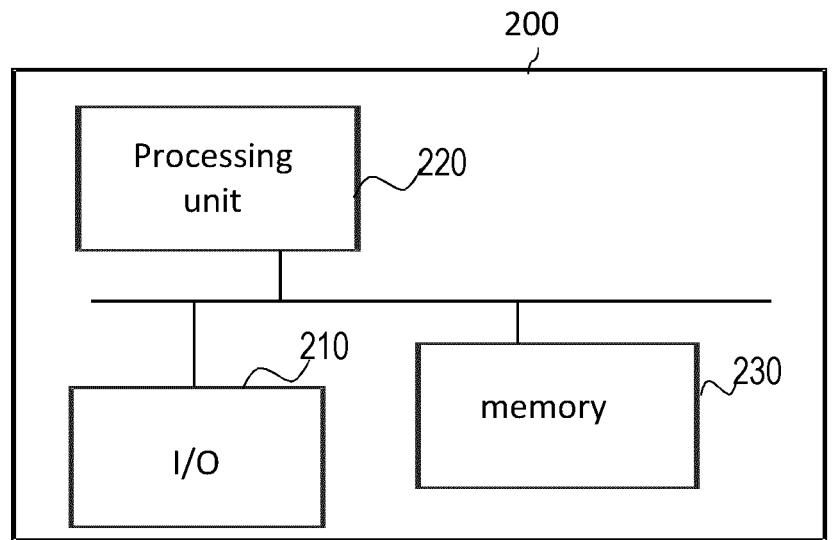
FIG. 7 shows a schematic representation of a service provider configured to assure a privacy protected use of a privacy related information.

FIG. 7 shows a schematic architectural view of the service provider 200 which can carry out the above discussed steps in the interaction with the service consumer. The service provider comprises an interface 210 configured to receive control messages or user data from other entities such as the service consumer and configured to transmit user data or control messages to other entities. The interface is configured to receive the service request and configured to transmit the response including the privacy model entity user information. The service provider furthermore comprises a processing unit 120 which is responsible for the operation of the service provider. The processing unit 220 comprises one or more processors and can carry out instructions stored on a memory 230, wherein the memory can include a read-only memory, a random access memory, a mass storage, a hard disk or the like. The memory 230 can include suitable program code to be executed by the processing unit to implement the above described functionalities in which the service provider is involved.

Figure 8:
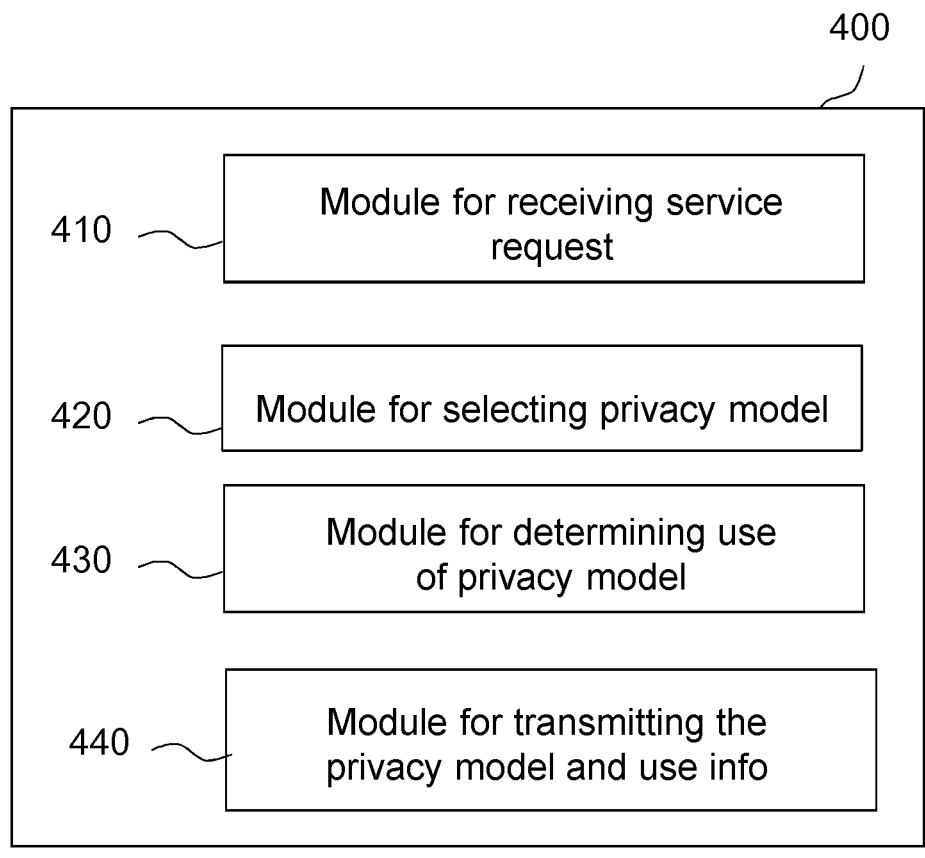
FIG. 8 shows another example schematic representation of a service provider configured to assure a privacy protected use of a privacy related information.

FIG. 8 shows another schematic architectural view of the service provider 400 comprising a first module 410 configured to receive the service request from the service consumer indicating that the privacy-related information should be privacy protected. The service provider 420 comprises a module 420 configured to select the privacy model based on the received indication. A module 430 is provided configured to determine how the selected privacy model should be used at the service consumer. A module 440 then is configured to transmit the privacy model and the corresponding indication how to use the privacy model to the service consumer 100.

From the above said some general conclusions can be drawn.

The received privacy model can comprise a service model which is configured to provide the requested network service to the service consumer 100 when the service consumer carries out the service. The service model can be configured to receive as input the privacy-related information without privacy protection and is configured to provide as output the requested network service. Accordingly, the processing of the privacy model at the service consumer 100 can include in this case the step of inputting the privacy-related information without privacy protection to the service model and determining as output the requested network service. This situation was discussed above in the use case a such S16*a* above.

A further option describes a situation where the privacy model includes a protection model which is configured to receive as input the privacy-related information without privacy protection and which is configured to generate as output the privacy-related information with privacy protection. Here, the processing of the privacy model and the service consumer means that the privacy-related information without privacy protection is input to the protection model and the output of the protection model is determined corresponding to the privacy related information with privacy protection.

The method may include the further step of transmitting a further service request, as known from step S16*b* to the service provider which includes the privacy-related information with privacy protection. Furthermore, the service consumer may receive a further service response from the service provider as shown in step S18*b* which includes the network service as generated based on the privacy protected privacy information.

The further service request may comprise a latent variable generated by an encoder decoder neural network system provided at the service consumer wherein the latent variable comprises the privacy-related information with privacy protection and the privacy model received with the service response is used at the service consumer as encoder part of the encoder decoder neural network system.

Here the processing of the privacy model can include the step of inputting the privacy-related information without privacy protection to the encoder part and determining the privacy-related information with privacy protection as encoded latent variable output by the encoder part.

The Received encoder part may be an aggregated encoder part that has been locally trained at a plurality of different service consumers and which was aggregated at the service provider.

The received privacy model can be used for distributed learning such as federated learning which could include federated aggregation, distributed stochastic gradient descent or distributed alternating algorithms. Here the received privacy model could be trained based on training data provided locally at the service consumer in order to generate an updated privacy model. The updated privacy model is then transmitted to the service provider.

The indication received in the service response of step S13 may indicate whether the privacy model is to be updated or not before use editor service consumer. The privacy model can then be updated are not based on the received indication.

The updated privacy model can be generated based on at least a part of the privacy related information.

The privacy-related information can include a mobility information indicating a degree of mobility of the service consumer. By way of example the mobility information may include the indication whether it is a static user, a mobile user or a highly mobile user.

The privacy-related information can furthermore include or relate to a time-dependent location of the service consumer or a time-dependent moving trajectory of the service consumer.

The indication how to use the privacy model can indicate whether the service consumer is to use the received privacy model in order to directly generate the requested network service at the service consumer or whether the privacy model is to be used to generate as output the privacy-related information with privacy protection.

The requested network service may contain different services such as a QoS sustainability analytics, an observed service experience analytics, a network function load analytics, a consumer mobility analytics, or a data network performance analytics.

As far as the service provider is concerned, for determining how to use the privacy model the service consumer may determine whether the service consumer is to use the received privacy model in order to directly generate the requested network service at the service consumer or whether the privacy model is to be used at the service consumer to generate as output the privacy-related information with privacy protection which is to be transmitted to the service provider.

Here the privacy model can include a service model or a prediction model as discussed above.

When the privacy model includes the protection model, the service provider may receive a further request from the service consumer including the privacy-related information with privacy protection. The service provided then inputs the privacy-related information with privacy protection into service model which is configured to receive as an input the privacy-related information with privacy protection and which is configured to provide as output the requested network service. The output of the service model is then transmitted to the service consumer.

The received service request may comprise a latent variable used by an encoder-decoder neural network system provided at the service consumer wherein the privacy model transmitted with the service response comprises the encoder part of this encoder-decoder neural network system. The service provider may furthermore generate an aggregated encoder part based on different encoder parts received from different service consumers and the aggregated encoder part may be transmitted as privacy model to the service consumer.

The service response may further indicate whether the selected privacy model is to be updated are not at the service consumer before being used at the service consumer.

The service consumer may be a vehicle or vehicle server.

The present application has the following advantages:

It can meet privacy concerns of users while providing a competitive/accurate network services also when it is based on the usage of privacy-related information.

For players such as car manufactures in automotive industry, the proposed solution allows network operator to offer services to their automotive customers without requiring sharing of their personal information with the network operator. For car manufactures, this would represent an added value for their service offer as the final users (drivers, passengers, etc.) will be sure that privacy-related information will not be transmitted.

As additional advantage, the proposed solution might also help in reducing the network footprint in terms of transferred information required to enable a certain framework, as an example, there is in a:

Conventional System: Periodical transfer of UE positions (or vehicle trajectory) versus Proposed System: limited transfer of privacy protection model The proposed solution can be used as a baseline for several network services, potentially for all network services dealing with privacy-related information. This solution can be considered as a new framework that can be used in upcoming mobile networks to avoid transfer of privacy-related information to mobile network

The invention claimed is:

1. A method for operating a service consumer which is requesting to utilize a network service provided by a service provider in a cellular network, the method comprising, at the service consumer:

transmitting a service request to the service provider, the service request comprising a privacy indication indicating that a privacy related information necessary as input for the network service is requested to be privacy protected when used outside the service consumer;

receiving a service response from the service provider, the service response comprising a privacy model and an indication how to use the privacy model, the privacy model comprising a protection model configured to receive as input the privacy related information without privacy protection and configured to generate as output the privacy related information with privacy protection;

processing the privacy model at the service consumer based on the indication, processing the privacy model comprising inputting the privacy related information without privacy protection to the protection model and determining as output of the protection model the privacy related information with privacy protection;

transmitting a further service request to the service provider including the privacy related information with privacy protection, the further service request comprising a latent variable generated by an encoder-decoder neural network system provided at the service consumer, the latent variable comprising the privacy related information with privacy protection, the privacy model received with the service response used at the service consumer as an encoder part of the encoder-decoder neural network system; and receiving a further service response from the service provider including the requested network service as generated based on the privacy protected privacy information.

2. The method of claim 1, wherein the privacy model comprises a service model configured to provide the requested network service to the service consumer when carried out at the service consumer, the service model being configured to receive as an input the privacy related information without privacy protection and configured to provide as output the requested network service, wherein processing the privacy model comprises inputting the privacy related information without privacy protection to the service model and determining the output of the service model as requested network service.

3. The method of claim 1, wherein processing the privacy model comprises inputting the privacy related information without privacy protection to the encoder part and determining the privacy related information with privacy protection as an encoded latent variable output by the encoder part.

4. The method of claim 1, wherein the received encoder part is an aggregated encoder part that has been locally trained at a plurality of different service consumers and was aggregated at the service provider.

5. The method of claim 1, wherein the received privacy model is used for distributed learning, further comprising:

training the received privacy model based on training data provided locally at the service consumer in order to generate an updated privacy model; and transmitting the updated privacy model to the service provider.

6. The method of claim 5, wherein the indication received in the service response indicates whether the privacy model is to be updated or not before use at the service consumer, wherein the privacy model is updated or not based on the received indication.

7. The method of claim 5, wherein the updated privacy model is generated based on at least a part of the privacy related information.

8. The method of claim 1, wherein the privacy related information comprises a mobility information indicating a degree of mobility of the service consumer.

9. The method of claim 1, wherein the privacy related information comprises at least one of a time dependent location of the service consumer, and a time dependent moving trajectory of the service consumer.

10. The method of claim 1, wherein the indication how to use the privacy model indicates whether the service consumer is to use the received privacy model in order to directly generate the requested network service at the service consumer or whether the privacy model is to be used to generate as output the privacy related information with privacy protection.

11. The method of claim 1, wherein the network service comprises at least one of the following:

Quality of Service (QOS) Sustainability Analytics;

Observed Service Experience Analytics;

Network function load analytics;

consumer mobility analytics; and a data network performance analytics.

12. A method for operating a service provider configured to provide a network service in a cellular network, the method comprising, at the service provider:

receiving a service request from a service consumer configured to utilize the network service, the service request comprising a privacy indication indicating that a privacy related information necessary as input for the network service is requested to be privacy protected when used outside the service consumer;

selecting a privacy model for the service consumer taking into account the privacy indication, the privacy model comprising a protection model configured to receive as input the privacy related information without privacy protection and configured to generate as output the privacy related information with privacy protection;

determining how to use the selected privacy model at the service consumer, determining how to use the selected privacy model comprising inputting the privacy related information without privacy protection to the protection model and determining as output of the protection model the privacy related information with privacy protection; and transmitting a service response to the service consumer, the service response comprising the selected privacy model and an indication how to use the selected privacy model at the service consumer;

receiving a further service request from the service consumer including the privacy related information with privacy protection, the further service request comprising a latent variable generated by an encoder-decoder neural network system provided at the service consumer, the latent variable comprising the privacy related information with privacy protection, the privacy model received with the service response used at the service consumer as an encoder part of the encoder-decoder neural network system; and transmitting a further service response to the service consumer including the requested network service as generated based on the privacy protected privacy information.

13. The method of claim 12, wherein determining how to use the privacy model comprises determining whether the service consumer is to use the received privacy model in order to directly generate the requested network service at the service consumer or whether the privacy model is to be used at the service consumer to generate as output the privacy related information with privacy protection which is to be transmitted to the service provider.

14. The method of claim 12, wherein the privacy model comprises a service model configured to provide the requested network service to the service consumer when carried out at the service consumer, the service model being configured to receive as an input the privacy related information without privacy protection and configured to provide as output the requested network service.

15. A service consumer configured to request utilization of a network service provided by a service provider in a cellular network, the service consumer comprising a memory and at least one processing unit, the memory containing instructions executable by the at least one processing unit to cause the service consumer to:

transmit a service request to the service provider, the service request comprising a privacy indication indicating that a privacy related information necessary as input for the network service is requested to be privacy protected when used outside the service consumer;

receive a service response from the service provider, the service response comprising a privacy model and an indication how to use the privacy model, the privacy model comprising a protection model configured to receive as input the privacy related information without privacy protection and configured to generate as output the privacy related information with privacy protection;

process the privacy model at the service consumer based on the indication, processing the privacy model comprising inputting the privacy related information without privacy protection to the protection model and determining as output of the protection model the privacy related information with privacy protection;

transmit a further service request to the service provider including the privacy related information with privacy protection, the further service request comprising a latent variable generated by an encoder-decoder neural network system provided at the service consumer, the latent variable comprising the privacy related information with privacy protection, the privacy model received with the service response used at the service consumer as an encoder part of the encoder-decoder neural network system; and receive a further service response from the service provider including the requested network service as generated based on the privacy protected privacy information.

16. A service provider configured to provide a network service in a cellular network, the service provider comprising a memory and at least one processing unit, the memory containing instructions executable by the at least one processing unit to cause the service consumer to:

receive a service request from a service consumer configured to utilize the network service, the service request comprising a privacy indication indicating that a privacy related information necessary as input for the network service is requested to be privacy protected when used outside the service consumer;

select a privacy model for the service consumer taking into account the privacy indication, the privacy model comprising a protection model configured to receive as input the privacy related information without privacy protection and configured to generate as output the privacy related information with privacy protection;

determine how to use the selected privacy model at the service consumer, determining how to use the selected privacy model comprising inputting the privacy related information without privacy protection to the protection model and determining as output of the protection model the privacy related information with privacy protection;

transmit a service response to the service consumer, the service response comprising the selected privacy model and an indication how to use the selected privacy model at the service consumer;

receive a further service request from the service consumer including the privacy related information with privacy protection, the further service request comprising a latent variable generated by an encoder-decoder neural network system provided at the service consumer, the latent variable comprising the privacy related information with privacy protection, the privacy model received with the service response used at the service consumer as an encoder part of the encoder-decoder neural network system; and transmit a further service response to the service consumer including the requested network service as generated based on the privacy protected privacy information.

* * * * *